(12) United States Patent
Yohsuke et al.

(10) Patent No.: US 11,168,784 B2
(45) Date of Patent: Nov. 9, 2021

(54) VEHICLE SHIFTER DEVICE

(71) Applicant: MAZDA MOTOR CORPORATION, Hiroshima (JP)

(72) Inventors: Takenaga Yohsuke, Hiroshima (JP); Daiki Nakata, Higashihiroshima (JP); Toshihiro Matsuoka, Higashihiroshima (JP); Masayuki Tokumo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 166 days.

(21) Appl. No.: 16/447,795

(22) Filed: Jun. 20, 2019

(65) Prior Publication Data

US 2019/0390763 A1 Dec. 26, 2019

(30) Foreign Application Priority Data

Jun. 20, 2018 (JP) .............................. JP2018-116922

(51) Int. Cl.
*F16H 59/02* (2006.01)
*F16H 59/10* (2006.01)
*F16H 59/12* (2006.01)
*F16H 61/24* (2006.01)

(52) U.S. Cl.
CPC ....... *F16H 59/0278* (2013.01); *F16H 59/105* (2013.01); *F16H 59/12* (2013.01); *F16H 2059/0282* (2013.01); *F16H 2061/243* (2013.01)

(58) Field of Classification Search
CPC .... F16H 59/0278; F16H 59/105; F16H 59/12; F16H 2016/243; F16H 59/02; F16H 2059/026; F16H 2059/0282
See application file for complete search history.

(56) References Cited

U.S. PATENT DOCUMENTS

| 7,640,823 | B2* | 1/2010 | Bowman | F16H 59/0204 74/473.33 |
|---|---|---|---|---|
| 8,402,858 | B2* | 3/2013 | Burger | F16H 59/04 74/473.21 |
| 9,254,745 | B2* | 2/2016 | Tokumo | B60K 20/08 |
| 9,316,304 | B2* | 4/2016 | Park | F16H 59/0278 |
| 9,334,952 | B2* | 5/2016 | Tokumo | F16H 59/08 |

(Continued)

FOREIGN PATENT DOCUMENTS

EP 2728224 A1 * 5/2014 ............. F16H 61/24

*Primary Examiner* — Jake Cook
*Assistant Examiner* — Gregory Robert Weber
(74) *Attorney, Agent, or Firm* — Studebaker & Brackett PC

(57) ABSTRACT

A vehicle shifter device for ensuring high safety by suppressing misoperation by a driver. The vehicle shifter device includes a shift lever and a lock plate. The shift lever has a cylindrical lever body, a rod movable in an axial direction in a cylinder of the lever body, and a first lock lever and a second lock lever connected to the rod. The first lock lever is substantially L-shaped in plan view. The lock plate has a first extension portion extending in an X-direction and a second extension portion, integrally formed with the first extension portion, that extends in a Y-direction. In addition, the lock plate has a plurality of concave parts. In the lock plate, the projection height of a convex part between the concave part and the concave part is larger than the projection height of a convex part between the concave part and the concave part.

8 Claims, 11 Drawing Sheets

(56) References Cited

U.S. PATENT DOCUMENTS

| | | | |
|---|---|---|---|
| 10,094,467 B2* | 10/2018 | Kato | F16H 59/10 |
| 10,184,557 B2* | 1/2019 | Kato | B60K 20/02 |
| 2004/0079613 A1* | 4/2004 | Cho | F16H 61/22 |
| | | | 192/220.7 |
| 2005/0223834 A1* | 10/2005 | Otsuka | F16H 59/0204 |
| | | | 74/473.18 |
| 2007/0068325 A1* | 3/2007 | Rudelic | F16H 59/0278 |
| | | | 74/523 |
| 2019/0219150 A1* | 7/2019 | Kanatani | F16H 59/0278 |
| 2019/0265747 A1* | 8/2019 | Yamamoto | G05G 5/04 |

* cited by examiner

_US 11,168,784 B2_

VEHICLE SHIFTER DEVICE

BACKGROUND

Technical Field

The present disclosure relates to a vehicle shifter device.

Background Art

A vehicle shifter device is provided in a center console or an instrument panel to receive an input concerning a switchover among speed ranges from a driver. An example of a vehicle shifter device is a mechanical vehicle shifter device that is mechanically connected to an automatic transmission via a cable or the like or a so-called shift-by-wire vehicle shifter device that performs a speed change by electrically detecting the position of a shift lever selected by the driver and sending information of the detected position to a control unit via an electric signal.

Since the support structure of a shift lever can be small-sized in a shift-by-wire vehicle shifter device, the entire device can be small-sized.

JP-A-2007-253912 discloses a vehicle shifter device that selects a reverse (R) position and a drive (D) position by operating a shift lever and selects or deselects a parking (P) position and a neutral (N) range by operating a push button switch.

SUMMARY

However, in the vehicle shifter device disclosed in JP-A-2007-253912, since the R-position and the D-position need to be selected by operating the shift lever and the P-position and the N-position need to be selected by operating the push button disposed away from the shift lever, the driver is requested to perform a complicated operation. Accordingly, in the vehicle shifter device disclosed in JP-A-2007-253912, there is a concern about a misoperation of the driver. Such a misoperation during a switchover among speed ranges becomes a large problem in the driving of a vehicle that requires a high level of security.

The disclosure thus provides a vehicle shifter device capable of ensuring a high level of security by suppressing a misoperation by the driver.

According to the disclosure, there is provided a vehicle shifter device that performs a switchover among a plurality of speed ranges of a vehicle including a parking range, a reverse range, a neutral range, and a drive range based on an operation by a driver. The vehicle shifter device includes a shift lever that receives an input by the driver and has a plurality of positions corresponding to the plurality of speed ranges; and a lever location holding part that holds the positions of the shift lever in locations selected by the driver, in which a path of movement of an upper end part of the shift lever when the driver performs a switchover among the reverse range, the neutral range, and the drive range is different in direction from a path of movement of the upper end part when the driver performs a switchover between the parking range and the reverse range. Also, the shift lever requests the driver to perform a first operation in addition to the movement of the upper end part when the driver performs a switchover between the reverse range and the neutral range and the shift lever requests the driver to perform a second operation in addition to the movement of the upper end part when the driver performs a switchover between the parking range and the reverse range. The second operation has a different operational degree from the first operation or the second operation being a different operation from the first operation.

In the vehicle shifter device according to the aspect, since the path of the movement of the upper end part (part grasped by the driver for operation) of the shift lever during a switchover among the reverse (R) range, the neutral (N) range, and the drive (D) range is different in direction from the path of the movement of the upper end part during the switchover between the parking (P) range and the R-range, the difference in the operational direction of the shift lever suppresses an undesirable operation by the driver such as a switchover among speed ranges from the R-range to the P-range or an undesirable operation from the P-range to the D-range directly.

In addition, the vehicle shifter device according to the aspect requests the driver trying a switchover between the R-range and the N-range to perform the first operation and the driver trying a switchover between the P-range and the R-range to perform the second operation. Since the second operation has a different operational degree from the first operation or the second operation is a different operation from the first operation, the driver does not undesirably perform a switchover between the P-range and the R-range.

Accordingly, the vehicle shifter device according to the aspect suppresses a misoperation by the driver and ensures a high level of security.

In the vehicle shifter device according to the aspect, the shift lever may be provided in the upper end part and have a push button through which the operation by the driver is received, the first operation may be to depress the push button to a predetermined depth by the driver, and the second operation may be to depress the push button to a depth larger than the predetermined depth by the driver.

In the vehicle shifter device that adopts the above structure, since the depression depth of the push button in the second operation is larger than that of the first operation, the driver needs to intentionally press the push button more deeply during a switchover between the P-range and the R-range, thereby suppressing a misoperation more reliably.

In the vehicle shifter device according to the aspect, the shift lever may further include a lever body that is a cylindrical body, a shift knob that is attached to an upper end portion of the lever body, and at least one lock lever projecting radially outward from a part of the lever body, the part being disposed below the shift knob, the push button may be provided in the upper end portion of the lever body, and the lock lever may move up and down in a cylindrical axis direction of the lever body when the driver depresses the push button and may be locked to or released from the lever location holding part when the lock lever moves up and down.

In the vehicle shifter device that adopts the above structure, the lock lever moves up and down in response to depression of the push button by the driver and, when the lock lever moves up and down, the lock lever is locked to or released from the lever location holding part. Accordingly, the location of the shift lever can be surely held in individual positions using a simple structure.

In the vehicle shifter device according to the aspect, the at least one lock lever may include a first lock lever projecting in one direction of radial directions of the lever body and a second lock lever projecting in a direction opposite to the one direction of the radial directions of the lever body. The first lock lever may include a root portion extending linearly in the one direction from the lever body and an end portion bent in a direction orthogonal to the root portion from an end of the root portion. The root portion being formed integrally with the end portion, and the second lock lever may extend linearly in the direction opposite to the one direction in plan view in which the shift lever is seen from the cylindrical axis direction of the lever body. The lever location holding part may be a lock plate having a plurality of concave parts recessed upward so as to correspond to the plurality of positions of the shift lever. The lock plate may include a first extension portion along the path of the movement of the shift lever when the driver performs a switchover between the parking range and the reverse range and a second extension portion along the path of the movement of the shift lever when the driver performs a switchover among the reverse range, the neutral range, and the drive range. The first extension portion is formed integrally with the second extension portion, and may have an L shape as a whole in plan view seen from above. The concave parts to which the first lock lever is locked when the parking range and the reverse range are selected may be formed in the first extension portion, and the concave parts to which the second lock lever is locked when the reverse range, the neutral range, and the drive range are selected may be formed in the second extension portion.

In the vehicle shifter device that adopts the above structure, the first lock lever and the second lock lever project from the lever body and the direction in which the first lock lever projects from the lever body is opposite to that of the second lock lever. In addition, in the vehicle shifter device that adopts the above structure, the lock plate is L-shaped (or may be inverted-L-shaped depending on the viewing direction) in plan view.

Accordingly, in the vehicle shifter device that adopts the above structure, by locking at least one of the first lock lever and the second lock lever to the lock plate, which is the lever location holding part, the location of the shift lever can be surely held. In the vehicle shifter device according to the aspect, since the lock levers are elastically biased upward in an axial direction of the lever body, the lock levers may be located at upper ends of movable ranges of the lock levers when the driver does not depress the push button, and the lock plate may lock at least one of the first lock lever and the second lock lever so as to correspond to the plurality of positions of the shift lever.

Since the lock levers are elastically biased upward in the vehicle shifter device that adopts the above structure, the lock lever is biased toward the bottom of the concave part of the lock plate when the driver does not depress the push button. Accordingly, in the vehicle shifter device that adopts the above structure, the location of the shift lever is surely held in any one of the positions in the state in which the driver does not depress the push button.

In the vehicle shifter device according to the aspect, the plurality of concave parts provided in the first extension portion of the lock plate may include a first concave part that locks the first lock lever when the driver selects the parking range and a second concave part that locks the first lock lever when the driver selects the reverse range. The plurality of concave parts provided in the second extension portion of the lock plate may include a third concave part that locks the second lock lever when the driver selects the reverse range and a fourth concave part that locks the second lock lever when the driver selects the neutral range. A first convex part projecting downward may be provided between the first concave part and the second concave part in the first extension portion of the lock plate. A second convex part projecting downward may be provided between the third concave part and the fourth concave part in the second extension portion of the lock plate. Also, a height of the first convex part relative to bottoms of the first concave part and the second concave part may be larger than a height of the second convex part relative to bottoms of the third concave part and the fourth concave part.

Since the height of the first convex part relative to the bottoms of the first concave part and the second concave part is larger than the height of the second convex part relative to the bottoms of the third concave part and the fourth concave part in the vehicle shifter device that adopts the above structure, when the driver tries a switchover between the P-range and the R-range, the driver is requested to perform an intentional operation since the driver needs to depress the push button more deeply. Accordingly, the vehicle shifter device is preferable for suppression of a misoperation by the driver.

In the vehicle shifter device according to the aspect, when the driver selects the reverse range, the first lock lever may be locked to the second concave part and the second lock lever may be locked to the third concave part.

In the vehicle shifter device that adopts the above structure, when the R-range is selected, the first lock lever is locked to the second concave part and the second lock lever is locked to the third concave part. Accordingly, since the driver is requested to depress the push button during a switchover from the R-range to the P-range or a switchover from the R-range to the N-range, a misoperation is suppressed.

It should be noted here that the upward and downward direction in this specification represents the upward and downward direction of the vehicle.

The vehicle shifter devices described above can ensure a high level of security by suppressing a misoperation by the driver.

BRIEF DESCRIPTION OF THE DRAWINGS

FIGS. 4A-4C illustrate the locations of lock levers of the shift lever, in which FIG. 4A is a schematic cross sectional view illustrating the state in which a driver does not depress a push button, FIG. 4B is a schematic cross sectional view illustrating the state in which the driver has shallowly depressed the push button, and FIG. 4C is a schematic cross sectional view illustrating the state in which the driver has deeply depressed the push button;

DETAILED DESCRIPTION

Figure 1:
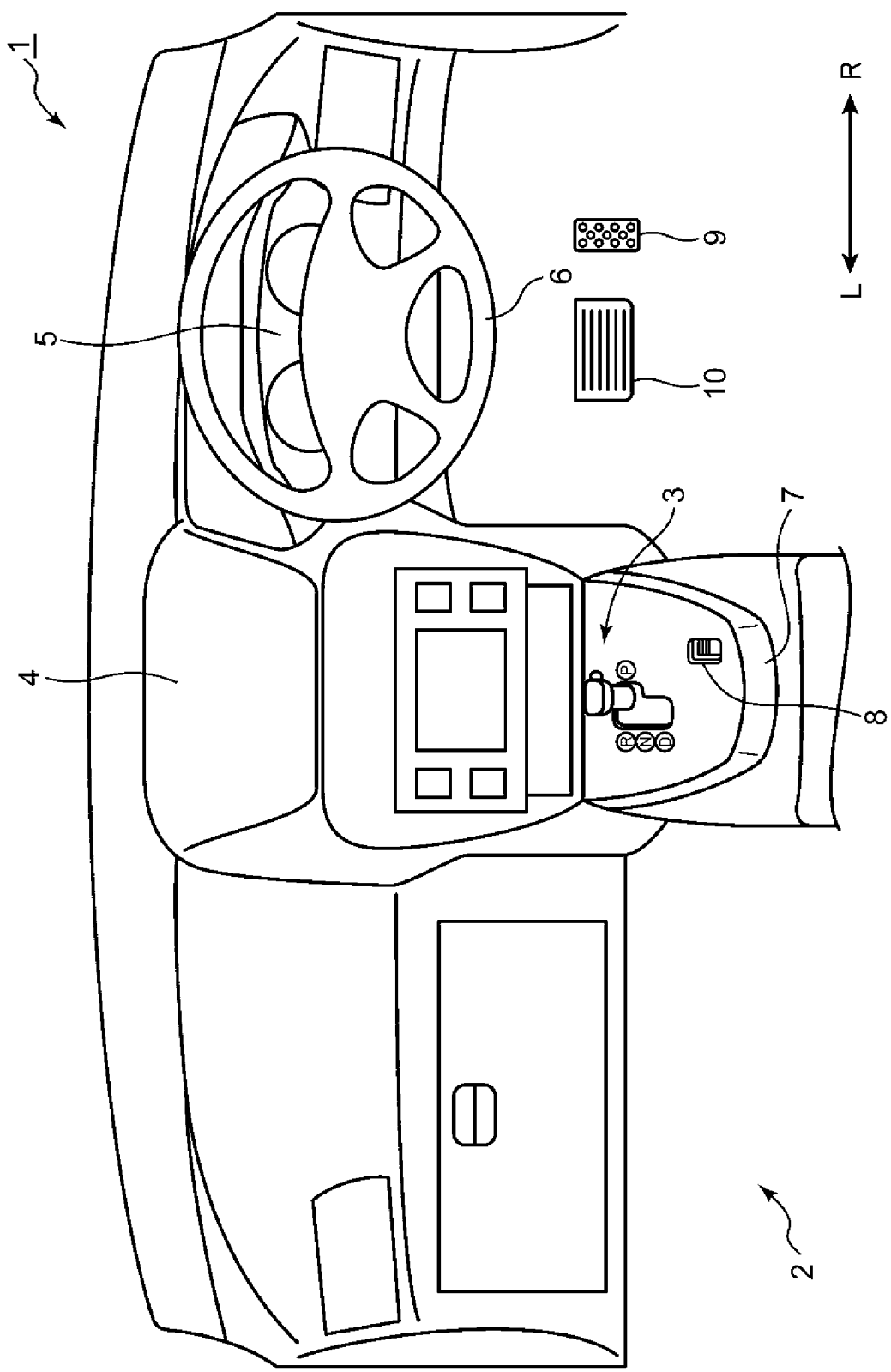
FIG. 1 is a schematic view illustrating the vehicle interior of a vehicle to which a vehicle shifter device according to an embodiment has been applied.

An embodiment of the disclosure will be described below with reference to the drawings. It should be noted here that the embodiment described below is only an example of the disclosure and the disclosure is not limited to the following embodiment except the essential structure.

In the drawings used in the following descriptions, "+X" and "R" represent the right direction of a vehicle, "−X" and "L" represent the left direction of the vehicle, "+Y" represents the front direction of the vehicle, "−Y" represents the rear direction of the vehicle, "+Z" represents the upward direction of the vehicle, and "−Z" represents the downward direction of the vehicle.

Embodiment

1. Structure of Vehicle Interior 2 of Vehicle 1

The structure of a vehicle interior 2 of a vehicle 1 will be described with reference to FIG. 1.

As illustrated in FIG. 1, a meter unit 5 of an instrument panel 4 and a steering handle 6 are disposed in front of the location in which a driver sits. The meter unit 5 displays a speed, engine revolutions, a gear range, and the like.

An acceleration pedal 9 and a brake pedal 10 are disposed in a foot part in front of the driver. A center console 7 is provided between a driver seat and a passenger seat. The center console 7 is provided so as to extend in a front-rear direction of the vehicle and an upper surface thereof is formed substantially flat so that the driver can place an arm thereon.

The center console 7 is provided with a vehicle shifter device 3 and a parking switch 8. The driver causes an automatic transmission (not illustrated) of the vehicle 1 to perform a switchover among a plurality of speed ranges by operating the vehicle shifter device 3. Specifically, the vehicle shifter device 3 can perform a switchover among speed ranges including a parking range (P-range), a reverse range (R-range), a neutral range (N-range), and a drive range (D-range).

The parking switch 8 is a switch, connected to a solenoid, that operates a parking brake. When the driver pulls up the front portion of the parking switch 8, the parking brake becomes effective.

2. External Structure of Vehicle Shifter Device 3 and Motion of the Upper End Part of Shift Lever 11

Figure 2:
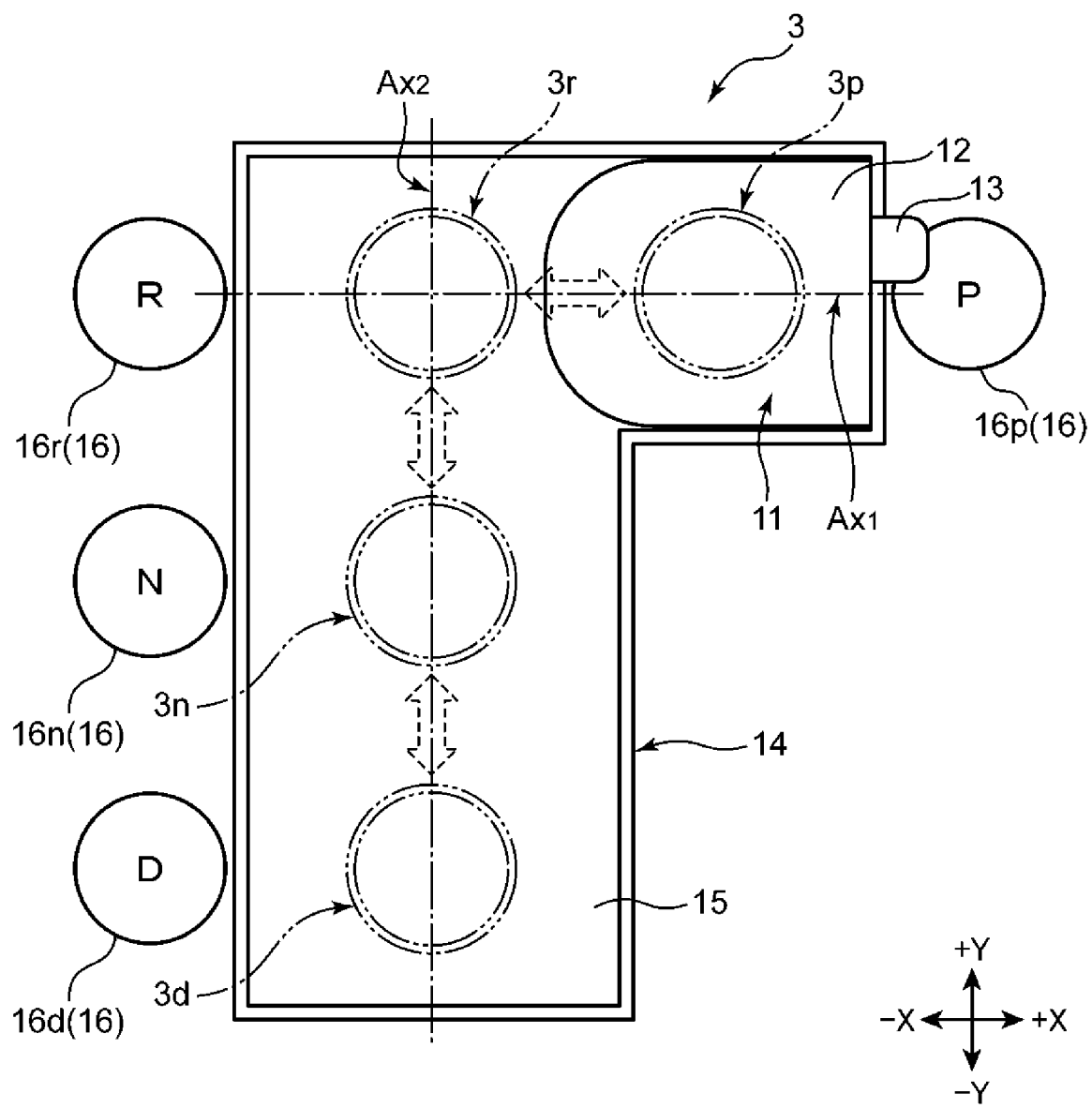
FIG. 2 is a schematic plan view illustrating the schematic structure of the vehicle shifter device.

The external structure of the vehicle shifter device 3 and the motion of the upper end part of a shift lever 11 will be described with reference to FIG. 2. FIG. 2 is a schematic plan view illustrating an excerpt a part of the center console 7 in FIG. 1.

An opening 14 is provided in the upper surface of the center console 7. The opening 14 is inverted-L-shaped in plan view from a +Z side (direction orthogonal to the sheet in FIG. 2).

The shift lever 11 passing through the opening 14 in a Z-direction is provided in the opening 14 of the center console 7. A shift knob 12 grasped by the driver is provided in the upper end part (end part in the front of the sheet in FIG. 2) of the shift lever 11. The shift knob 12 is provided with a push button 13 projecting toward a +X side (driver seat side). The push button 13 is depressed when the driver performs a switchover among speed ranges.

The opening 14 is covered with a cover 15 except the part into which the shift lever 11 is inserted. Indicators 16 (16p, 16r, 16n, and 16d) that indicate shift positions are provided on the +X side and a −X side of the opening 14. One of these indicators 16p, 16r, 16n, and 16d that corresponds to the selected shift position emits from a −Z side (the back of the sheet in FIG. 2) so that the driver can visually recognize the shift position easily.

As illustrated in FIG. 2, in the vehicle shifter device 3, a parking (P) position 3p and a reverse (R) position 3r are disposed along an X-direction. In other words, the P-position 3p and the R-position 3r are disposed on a straight line Ax1 extending in the X-direction.

In contrast, in the vehicle shifter device 3, the R-position 3r, a neutral (N) position 3n, and a drive (D) position 3d are disposed along a Y-direction. That is, the R-position 3r, the N-position 3n, and the D-position 3d are disposed on a straight line Ax2 extending in the Y-direction.

It should be noted here that the vehicle shifter device 3 according to the embodiment, the motion of the shift lever 11 between the P-position 3p and the R-position 3r is detected by an electric signal (by a shift-by-wire method) and the motion of the shift lever 11 among the R-position 3r, the N-position 3n, and the D-position 3d is sent to the automatic transmission as a speed change instruction via a coupled cable.

Returning to FIG. 2, the straight line Ax1 intersects the straight line Ax2 substantially orthogonally. However, an angle $\theta_1$ at which the straight line Ax1 intersects the straight line Ax2 may be smaller than 90 degrees or larger than 90 degrees in consideration of the natural motion of the arm of the driver.

When attempting to start the vehicle in the parking state, the driver first moves the upper end part (shift knob 12) of the shift lever 11 along the straight line Ax1 to switch the shift position from the P-position 3p to the R-position 3r. It should be noted here that, when attempting to move the shift lever 11, the driver needs to depress the push button 13.

After that, when attempting to move the vehicle 1 forward, the driver switches the shift position from the R-position 3r to the D-position 3d through the N-position 3n by moving the upper end part (shift knob 12) of the shift lever 11 along the straight line Ax2 and turns off the parking switch 8 (see FIG. 1).

It should be noted here that each of the corresponding indicators 16 (16p, 16r, 16n, and 16d) beside the shift lever 11 lights as the shift lever 11 moves. In addition, although not illustrated specifically, the meter unit 5 (see FIG. 1) also has indicators that indicate shift positions and each of these indicators also lights as the shift lever 11 moves.

3. Structure of Shift Lever 11

Figure 3:
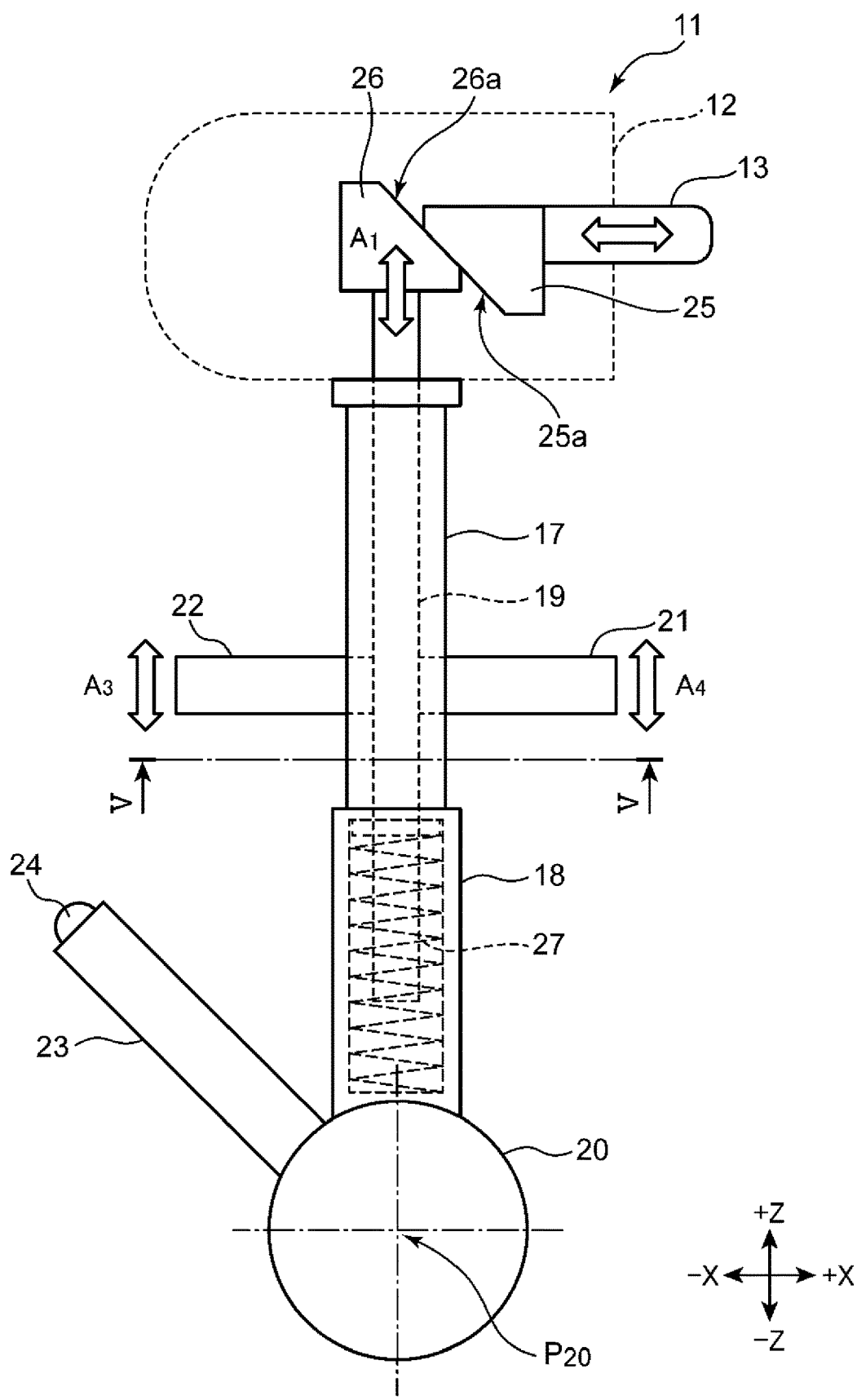
FIG. 3 is a schematic side view illustrating the structure of a shift lever.

The structure of the shift lever 11 will be described with reference to FIG. 3. FIG. 3 is a schematic side view illustrating the structure of the shift lever 11 in which the shift knob 12 is represented by a dashed line to clarify the internal structure.

As illustrated in FIG. 3, the shift lever 11 includes a cylindrical upper lever body 17, a lower lever body 18 formed integrally with the upper lever body 17 on the −Z side of the upper lever body 17, and a rod 19 movable within the cylinders of the upper lever body 17 and the lower lever body 18 in the Z-direction. The rod 19 has a first lock lever 21 projecting toward the +X side from a middle part in the Z-direction and a second lock lever 22 projecting toward the −X side from the middle part in the Z-direction. The first lock lever 21 and the second lock lever 22 are movable up and down in the Z-direction integrally with the rod 19.

In addition, the shift lever 11 includes a substantially spherical root part 20 connected to the −Z side of the lower lever body 18 and a detent case 23 projecting obliquely upward from the root part 20. The end portion of the detent case 23 accommodates a detent plunger 24 capable of moving in or out.

In addition, the shift lever 11 includes a head 26 connected to an upper end part (end part on the +Z side) of the rod 19, a push head 25 having an oblique surface 25a slidable on an oblique surface 26a of the head 26, and a spring 27 that elastically biases the rod 19 toward the +Z side. It should be noted here that a coil spring is adopted as one example of the spring 27 in the shift lever 11 according to the embodiment.

When the driver operates the push button 13, as the oblique surface 25a slides on the oblique surface 26a, the head 26 moves up and down and the rod 19, the first lock lever 21, and the second lock lever 22 also move up and down as indicated by arrows $A_1$, $A_3$, and $A_4$. In the state in which the driver does not depress the push button 13, the rod 19, the first lock lever 21, and the second lock lever 22 are located at the upper ends of the movable ranges in the Z-direction by a biasing force of the spring 27.

It should be noted here that the shift lever 11 can pivot about a center $P_{20}$ of the root part 20. Although not illustrated in FIG. 3, the posture (shift position) of the shift lever 11 can be detected by a pivotal angle sensor that detects the pivotal angle of the root part 20. The detent plunger 24 can move in or out of the detent case 23 and provides tactile feeling concerning operation for the driver when the shift lever 11 enters the individual shift position.

4. Depression Depth of Push Button 13 and Locations of Lock Levers 21 and 22

Figures 4A, 4B, 4C:
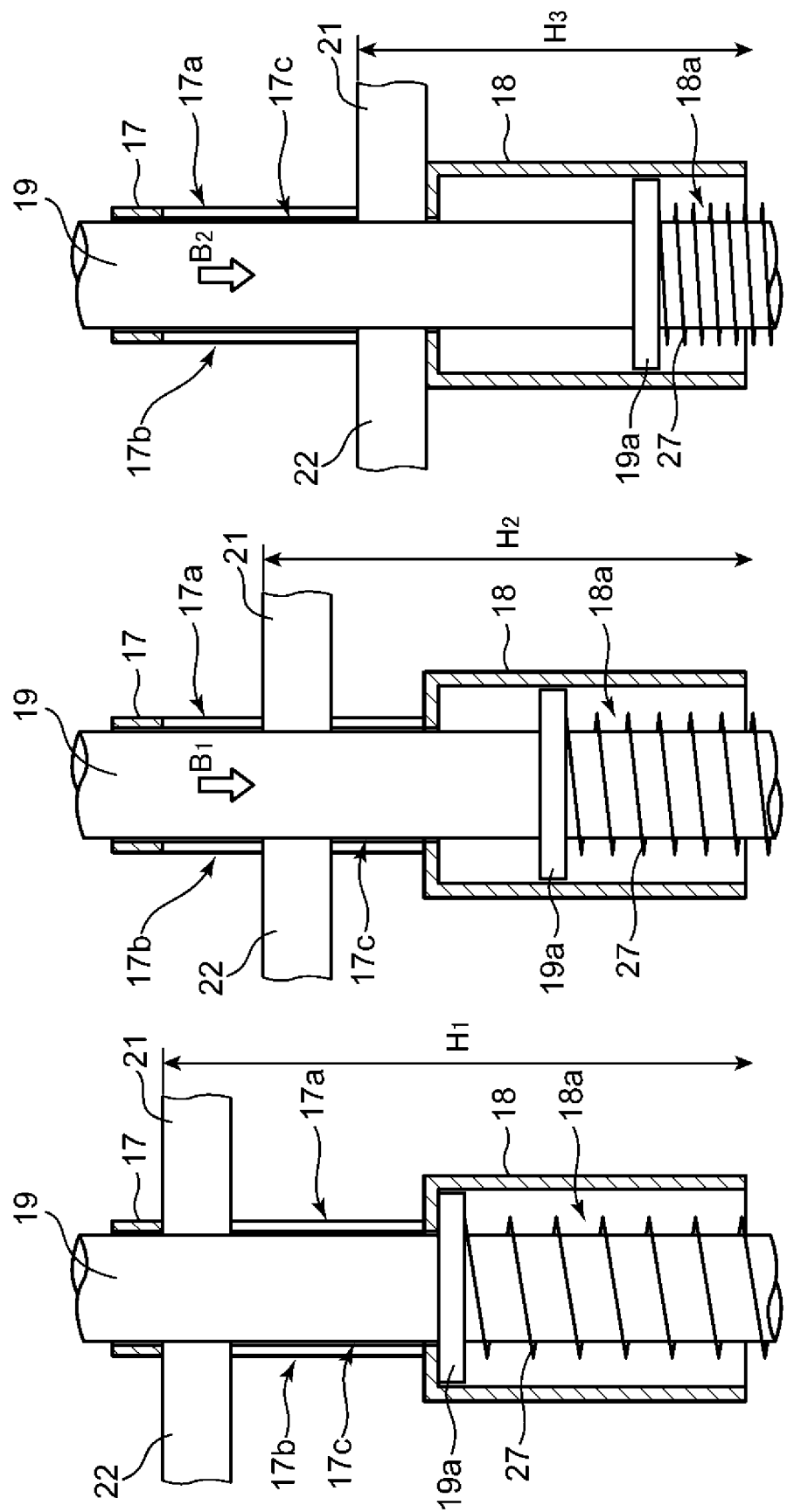

The relationship between the depression depth of the push button 13 and the locations of the lock levers 21 and 22 will be described with reference to FIGS. 4A-4C, which illustrate the locations of the lock levers of the shift lever. FIG. 4A is a schematic cross sectional view illustrating the state in which the driver does not depress the push button, FIG. 4B is a schematic cross sectional view illustrating the state in which the driver has shallowly depressed the push button, and FIG. 4C is a schematic cross sectional view illustrating the state in which the driver has deeply depressed the push button.

(1) State in which the Driver does not Depress Push Button 13

As illustrated in FIG. 4A, in the state in which the driver does not depress the push button 13, the first lock lever 21 and the second lock lever 22 are located in the upper ends of the movable ranges in the Z-direction. Accordingly, the upper ends of the first lock lever 21 and the second lock lever 22 are located at a height $H_1$ from the center $P_{20}$ (see FIG. 3).

Here, the first lock lever 21 projects outside through an opening 17a opened in the upper lever body 17 and the second lock lever 22 projects outside through an opening 17b. In addition, the first lock lever 21 and the second lock lever 22 move integrally with the rod 19 that moves within a cylinder space 17c of the upper lever body 17 and a cylinder space 18a of the lower lever body 18 in the Z-direction. It should be noted here that the cylinder space 18a of the lower lever body 18 accommodates the spring 27, which elastically biases a flange section 19a of the rod 19 toward the +Z side.

(2) State in which the Driver has Shallowly Depressed Push Button 13

As illustrated in FIG. 4B, in the state in which the driver has shallowly depressed (performed the first operation) the push button 13, the first lock lever 21 and the second lock lever 22 are pushed down toward the −Z side integrally with the rod 19 (arrow $B_1$). In this state, the spring 27 accommodated in the cylinder space 18a of the lower lever body 18 is compressed and reduced in length. In addition, in the state (state in FIG. 4B) in which the driver shallowly depresses the push button 13, the upper ends of the first lock lever 21 and the second lock lever 22 are located at a height $H_2$ from the center $P_{20}$ (see FIG. 3).

(3) State in which the Driver has Deeply Depressed Push Button 13

As illustrated in FIG. 4C, in the state in which the driver has deeply depressed (performed the second operation) the push button 13, the first lock lever 21 and the second lock lever 22 are further pushed down toward the −Z side integrally with the rod 19 (arrow $B_2$). In this state, the spring 27 accommodated in the cylinder space 18a of the lower lever body 18 is compressed and further reduced in length.

Since the spring 27 is further compressed as illustrated in FIG. 4C, the reaction force applied to the driver via the push button 13 becomes larger than in the state illustrated in FIG. 4B. In the state in FIG. 4C in which the driver has deeply depressed the push button 13, the upper ends of the first lock lever 21 and the second lock lever 22 are located at a height $H_3$ from the center $P_{20}$ (see FIG. 3).

5. Structures of First Lock Lever 21 and Second Lock Lever 22

Figure 5:
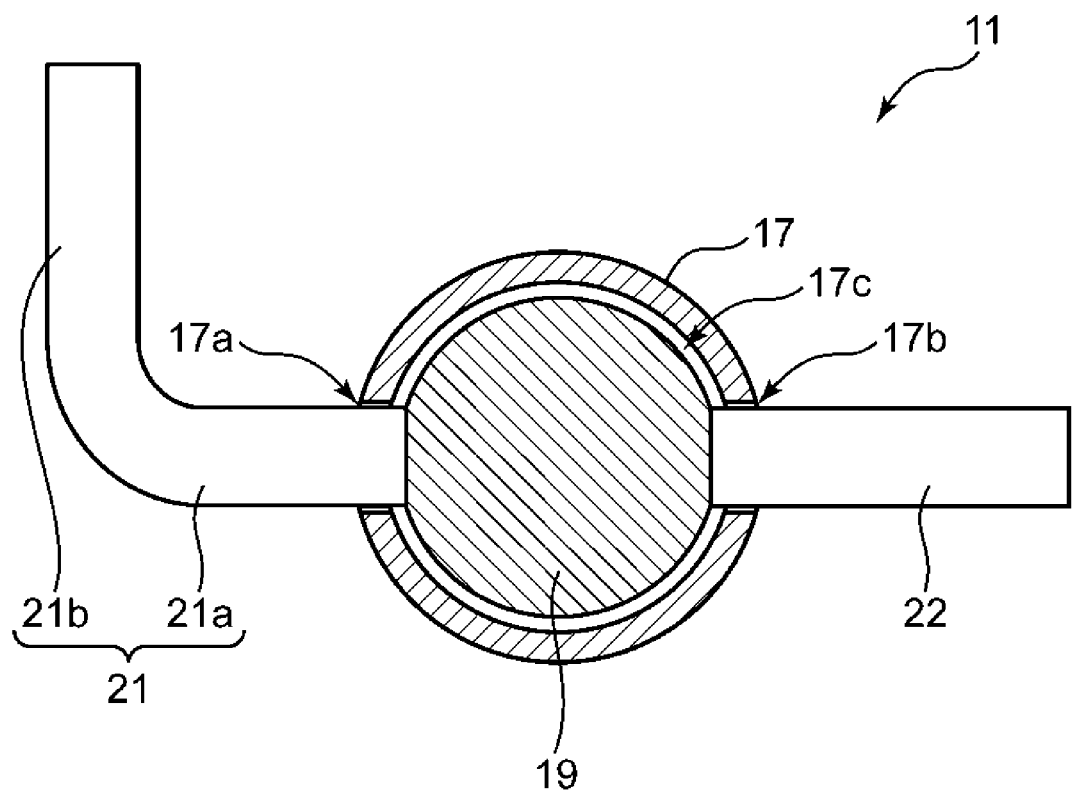
FIG. 5 is a schematic cross sectional view, taken along line V-V in FIG. 3, that illustrates the structures of the lock levers of the shift lever.
Figure 5:
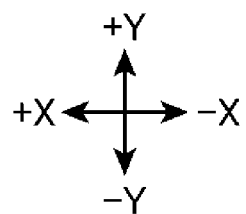

The structures of the first lock lever 21 and the second lock lever 22 will be described with reference to FIG. 5. FIG. 5 is a schematic cross sectional view taken along line V-V in FIG. 3.

As illustrated in FIG. 5, in plan view of the shift lever 11 seen from the −Z side, the first lock lever 21 projects from the rod 19 toward the +X side and the second lock lever 22 projects from the rod 19 toward the −X side. The first lock lever 21 has one end connected to the rod 19 and includes a root portion 21a that extends toward the +X side and a front end portion 21b that is bent toward a +Y side at the end part on the +X side of the root portion 21a, extends toward the +Y side, and is formed integrally with the root portion 21a. On the other hand, the second lock lever 22 extends linearly toward the −X side from the point at which the second lock lever 22 is connected to the rod 19.

6. Structure of Lock Plate 28

Figure 6:
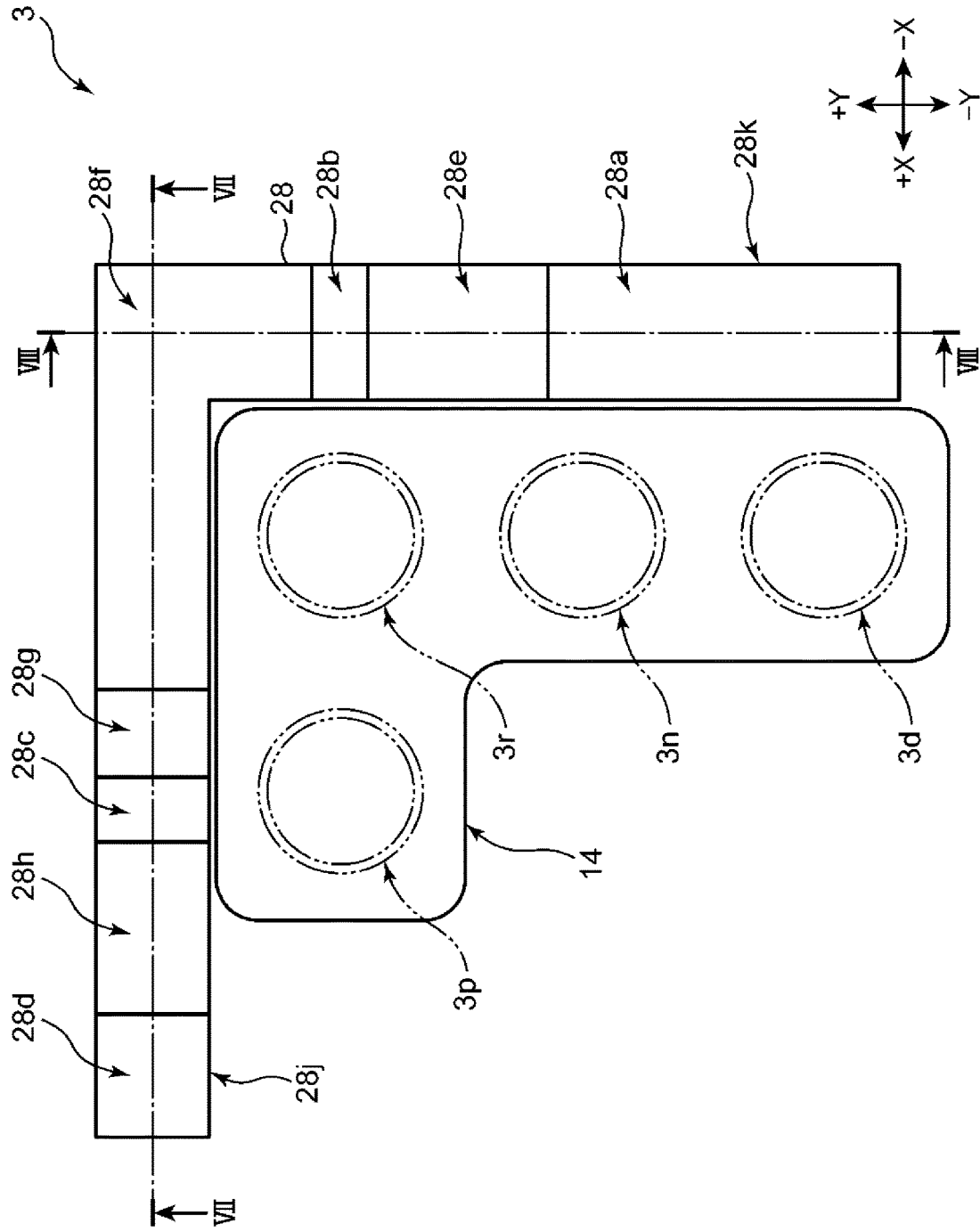
FIG. 6 is a schematic plan view illustrating the structure of a lock plate provided on a back surface of a center console.

The vehicle shifter device 3 according to the embodiment has a lock plate 28 provided in the interior (back surface side) of the center console 7. The lock plate 28 is provided as a lever location holding part that locks the lock levers 21 and 22 of the shift lever 11 in the individual shift positions and holds the location of the shift lever 11. The structure of the lock plate 28 will be described with reference to FIG. 6 to FIG. 8. FIG. 6 is a schematic plan view illustrating the structure of the lock plate 28 provided on the back surface side of the center console 7, seen from the lower side (−Z side) of the vehicle 1, FIG. 7 is schematic cross sectional view taken along line VII-VII in FIG. 6, and FIG. 8 is a schematic cross sectional view taken along line VIII-VIII in FIG. 8.

As illustrated in FIG. 6, the lock plate 28 is inverted-L-shaped as a whole in plan view from a −Z-direction and provided along the outer edge of the opening 14 provided in the center console 7. That is, the lock plate 28 includes a first extension portion 28j extending in the X-direction and a second extension portion 28k, extending in the Y-direction, that is formed integrally with the first extension portion 28j.

Figure 7:
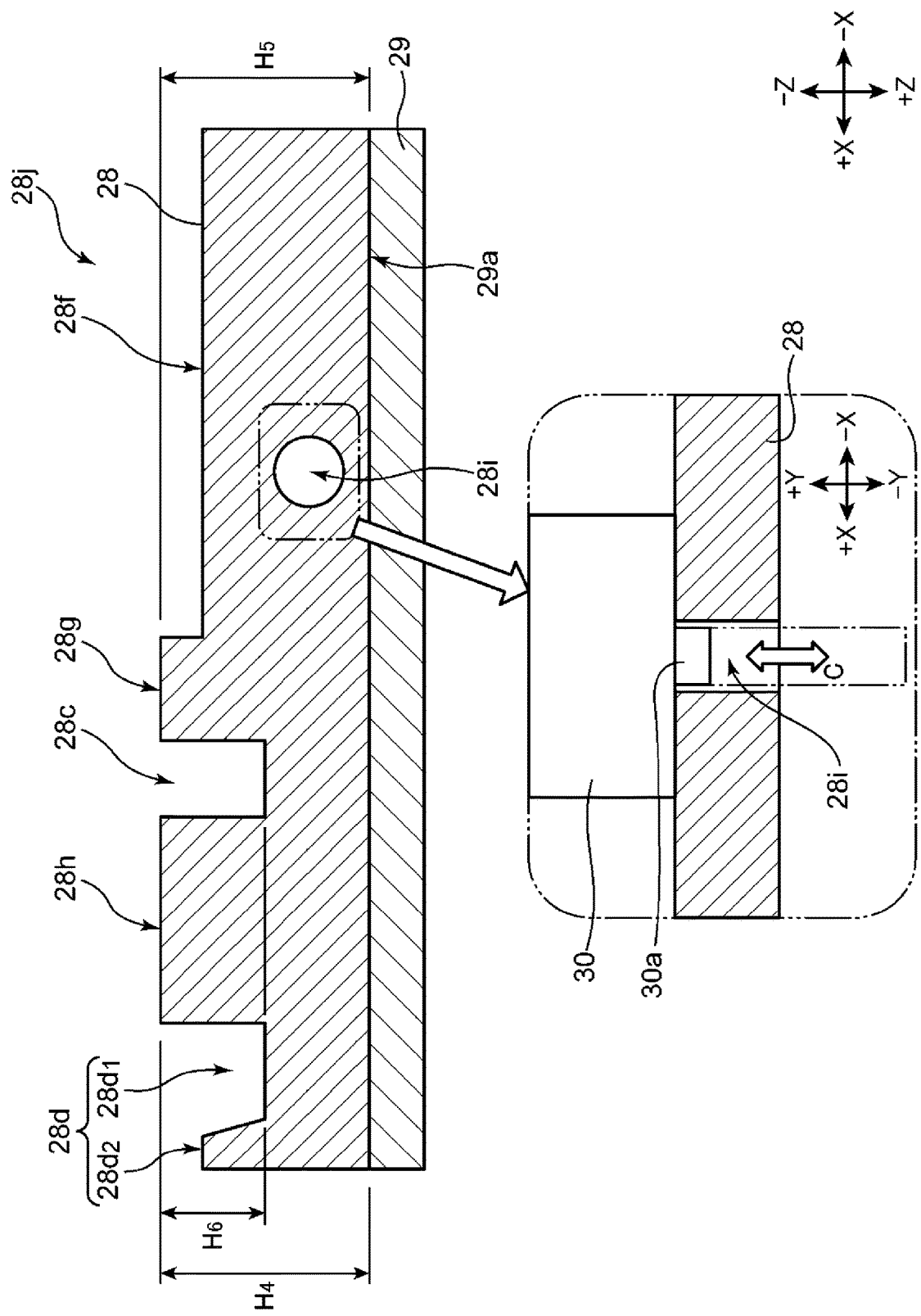
FIG. 7 is a schematic cross sectional view, taken along line VII-VII in FIG. 6, that illustrates the structure of a part of the lock plate.
Figure 8:
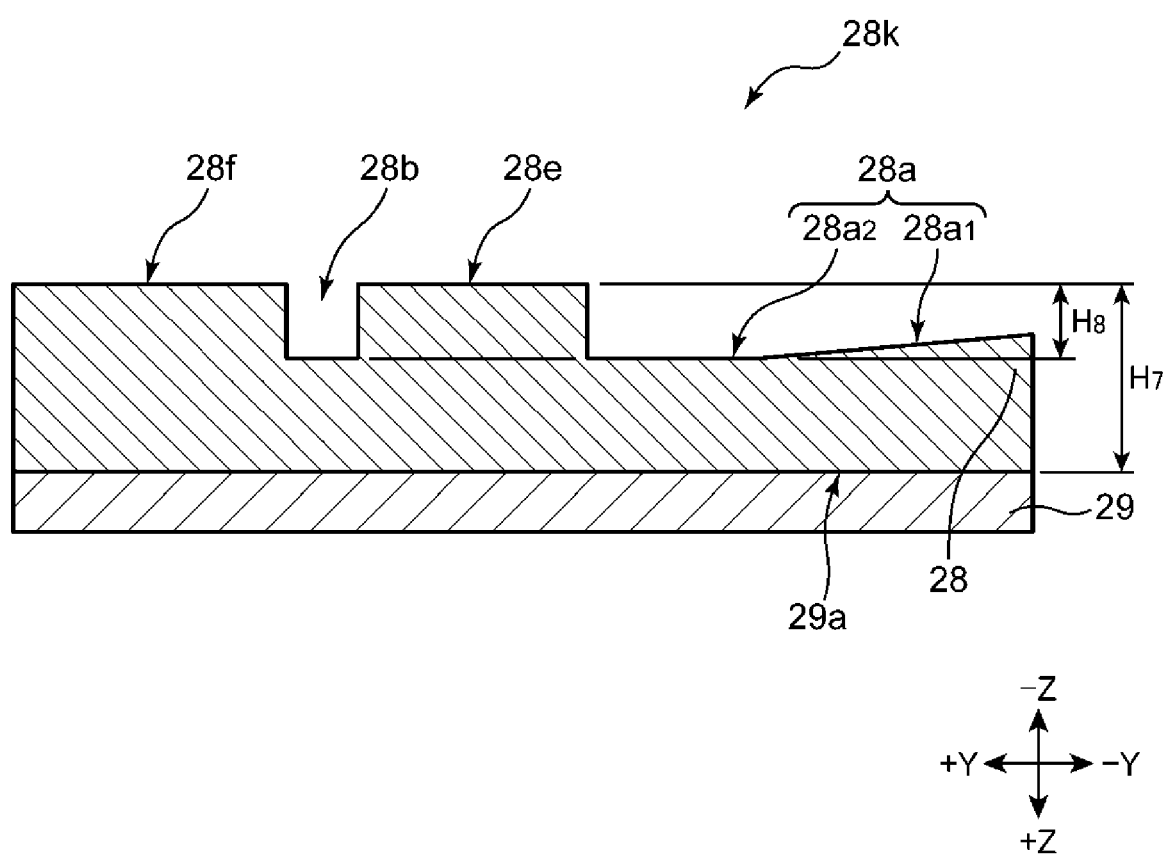
FIG. 8 is a schematic cross sectional view, taken along line VIII-VIII in FIG. 6, that illustrates the structure of a part of the lock plate.

As illustrated in FIG. 6 and FIG. 7, the first extension portion 28j of the lock plate 28 is provided with concave parts 28c and 28d recessed toward the +Z side and convex parts 28f, 28g, and 28h projecting toward the −Z side. As illustrated in FIG. 7, the convex part 28g has a projection height higher toward the −Z side than the convex part 28f.

As illustrated in FIG. 6 and FIG. 7, the convex part 28h is provided between the concave part 28c and the concave part 28d in the X-direction. It should be noted here that, as illustrated in FIG. 7, the concave part 28d has a deep bottom portion $28d_1$ deeply recessed toward the −Z side and a shallow bottom portion $28d_2$ having a recess depth shallower than the deep bottom portion $28d_1$ and disposed on the +X side of the deep bottom portion $28d_1$.

On the other hand, as illustrated in FIG. 6 and FIG. 8, the second extension portion 28k of the lock plate 28 is provided with concave parts 28a and 28b recessed toward the +Z side and a convex part 28e and the convex part 28f projecting toward the −Z side. The convex part 28e is provided between the concave part 28a and the concave part 28b in the Y-direction. It should be noted here that, as illustrated in FIG. 8, the concave part 28a includes an oblique surface portion $28a_1$ provided on a −Y side and configured by an oblique surface having a difference in height in the Z-direction and a second portion $28a_2$ provided on the +Y side of the oblique surface portion $28a_1$ and configured by a bottom that is a flat surface along the Y-direction.

As illustrated in FIG. 7 and FIG. 8, the lock plate 28 is disposed on the back surface side of the center console 7 and connected to a mount plate 29 connected to the vehicle body of the vehicle 1. As illustrated in FIG. 7, the height of the convex part 28h with respect to a surface 29a on the −Z side of the mount plate 29 is assumed to be $H_4$ and the height with respect to the surface 29a of the convex part 28g is assumed to be $H_5$. In addition, the height from the bottom of the concave part 28c and the deep bottom portion $28d_1$ of the concave part 28d to the top of the convex part 28h is assumed to be $H_6$.

Next, as illustrated in FIG. 8, the height of the convex part 28e with respect to the surface 29a on the −Z side of the mount plate 29 is assumed to be $H_7$, and the height from the bottom of the concave part 28b and the planar portion $28a_2$ of the concave part 28a to the top of the convex parts 28e and 28f is assumed to be $H_8$. In this case, the vehicle shifter device 3 according to the embodiment meets the following relationship.

$$H_4 > H_7 \quad \text{(Math. 1)}$$

$$H_6 > H_8 \quad \text{(Math. 2)}$$

$$H_4 \approx H_5 \quad \text{(Math. 3)}$$

Next, as illustrated in FIG. 7, the first extension portion 28j of the lock plate 28 is provided with a hole 28i penetrating through the first extension portion 28j in the thickness direction (Y-direction) thereof. As illustrated in the portion surrounded by the dot-dot-dash line in FIG. 7, a plunger 30a of a solenoid 30 is inserted into the hole 28i. The plunger 30a can move in and out in the Y-direction as indicated by arrow C. It should be noted here that, as illustrated in the portion surrounded by the dot-dot-dash line in FIG. 7, the area to which the plunger 30a projects is the area on the −Y side of the lock plate 28 in which the lever bodies 17 and 18 of the shift lever 11 are movable.

7. Locking of Lock Levers 21 and 22 to Lock Plate 28 for Each Shift Position

Figures 9A, 9B:
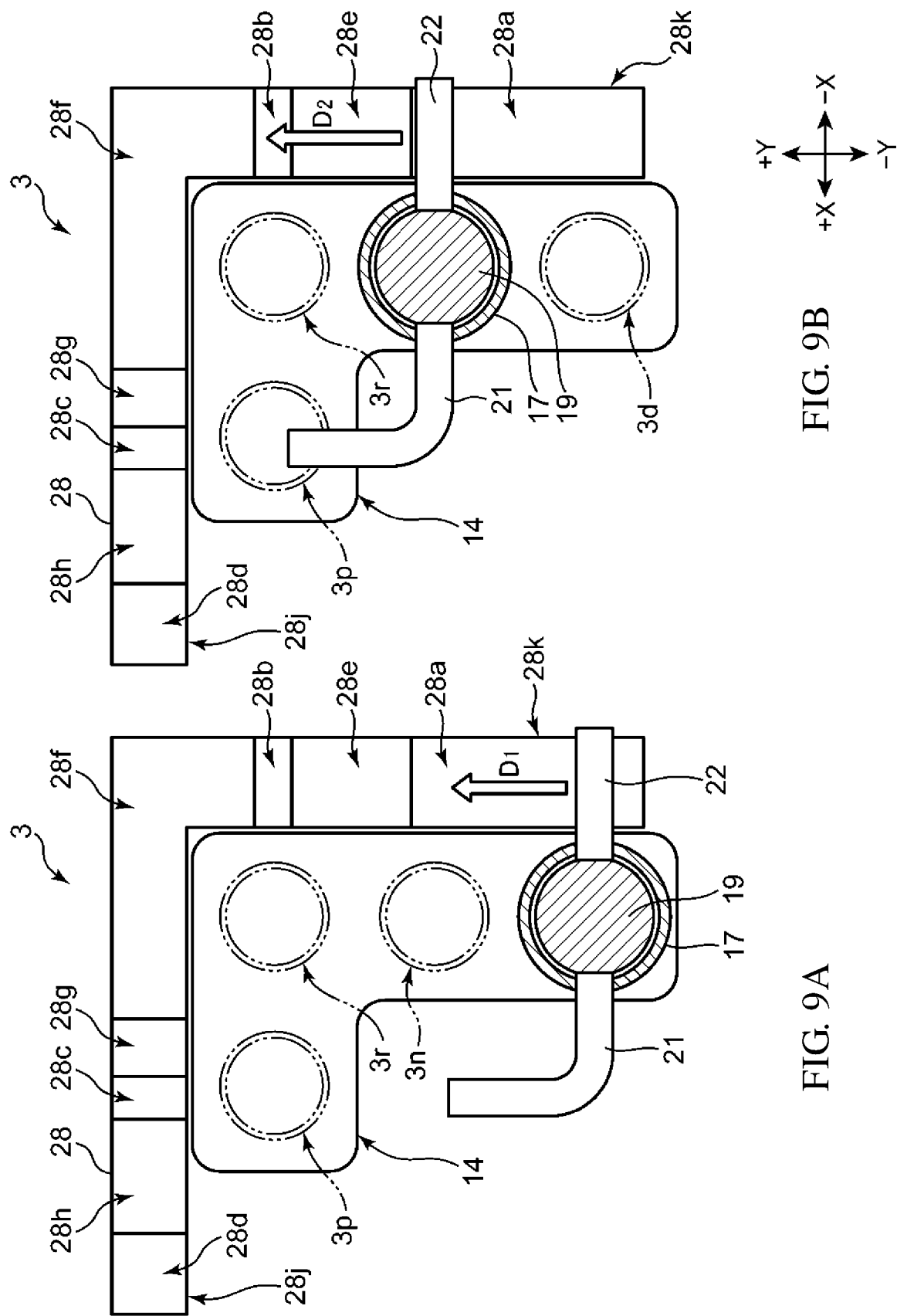
FIG. 9A is a schematic plan view illustrating the state of the lock levers with respect to the lock plate when a shift position is a D-position.
FIG. 9B is a schematic plan view illustrating the state of the lock levers with respect to the lock plate when the shift position is an N-position.
Figures 10A, 10B:
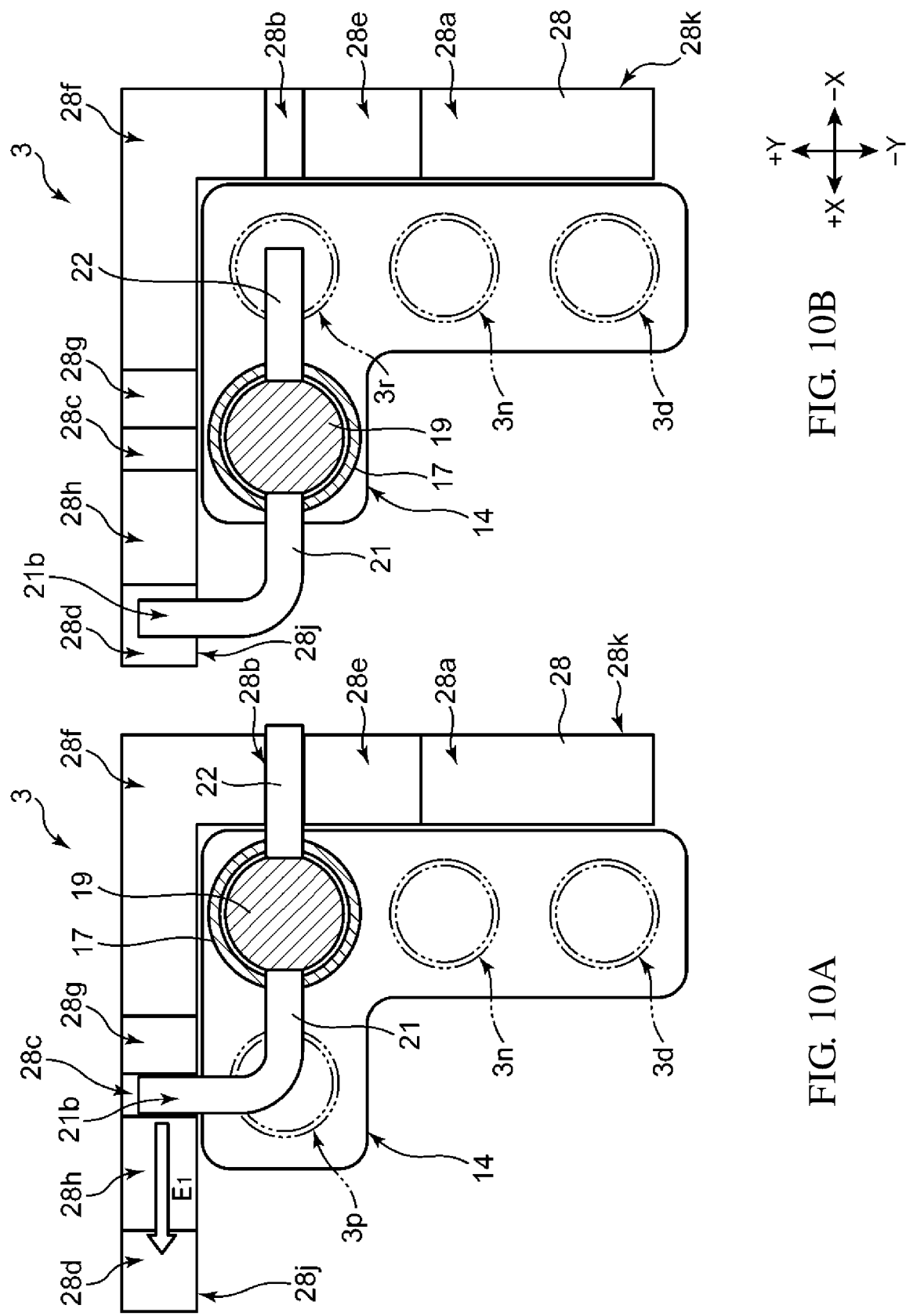
FIG. 10A is a schematic plan view illustrating the state of the lock levers with respect to the lock plate when the shift position is an R-position.
FIG. 10B is a schematic plan view illustrating the state of the lock levers with respect to the lock plate when the shift position is a P-position.

The form in which the lock levers 21 and 22 are locked to the lock plate 28 for each shift position will be described with reference to FIGS. 9A, 9B, 10A and 10B. FIG. 9A is a schematic plan view illustrating the state of the lock levers 21 and 22 with respect to the lock plate 28 when the shift position is the D-position, and FIG. 9B is a schematic plan view illustrating the state of the lock levers 21 and 22 with respect to the lock plate 28 when the shift position is the N-position. FIG. 10A is a schematic plan view illustrating the state of the lock levers 21 and 22 with respect to the lock plate 28 when the shift position is the R-position, and FIG. 10B is a schematic plan view illustrating the state of the lock levers 21 and 22 with respect to the lock plate 28 when the shift position is the P-position.

As illustrated in FIG. 9A, when the shift position is the D-position 3d, the second lock lever 22 is locked to the concave part 28a of the second extension portion 28k of the lock plate 28. In this case, the first lock lever 21 is not locked to the first extension portion 28j of the lock plate 28.

Next, when the shift lever 11 is moved as indicated by arrow $D_1$, the shift position becomes the N-position 3n as illustrated in FIG. 9B. It should be noted here that the movement from the D-position 3d to the N-position 3n does not require the driver to depress the push button 13 and only requires the driver to push the shift knob 12 toward the +Y side. As illustrated in FIG. 9B, when the shift position is the N-position 3n, the second lock lever 22 is located in the end area on the +Y side of the concave part 28a of the second extension portion 28k of the lock plate 28.

Next, when the shift lever 11 is moved as indicated by arrow $D_2$, the shift position becomes the R-position 3r as illustrated in FIG. 10A. It should be noted here that the movement from the N-position 3n to the R-position 3r requires the driver to shallowly depress the push button 13 (until the state in FIG. 4B is reached) and operate the shift lever 11 so that the second lock lever 22 climbs over the convex part 28e. As illustrated in FIG. 10A, when the shift position is the R-position 3r, the second lock lever 22 is locked to the concave part 28b of the second extension portion 28k of the lock plate 28 and the front end portion 21b of the first lock lever 21 is locked to the concave part 28c of the first extension portion 28j of the lock plate 28.

Next, when the shift lever 11 is moved as indicated by arrow $E_1$, the shift position becomes the P-position 3p as illustrated in FIG. 10B. It should be noted here that the movement from the R-position 3r to the P-position 3p requires the driver to deeply depress the push button 13 (until the state in FIG. 4C is reached) and operate the shift lever 11 so that the front end portion 21b of the first lock lever 21 climbs over the convex part 28h. As illustrated in FIG. 10B, when the shift position is the P-position 3p, the front end portion 21b of the first lock lever 21 is locked to the concave part 28d of the first extension portion 28j of the lock plate 28.

Although the form in which the shift position is moved in the order of the D-position 3d, the N-position 3n, the R-position 3r, and the P-position 3p has been described above as an example, an operation similar to the above can be applied to the case in which the shift position is moved in the reverse order, that is, the order of the P-position 3p, the R-position 3r, the N-position 3n, and the D-position 3d.

8. Movement from P-Position 3p to R-Position 3r

Figure 11:
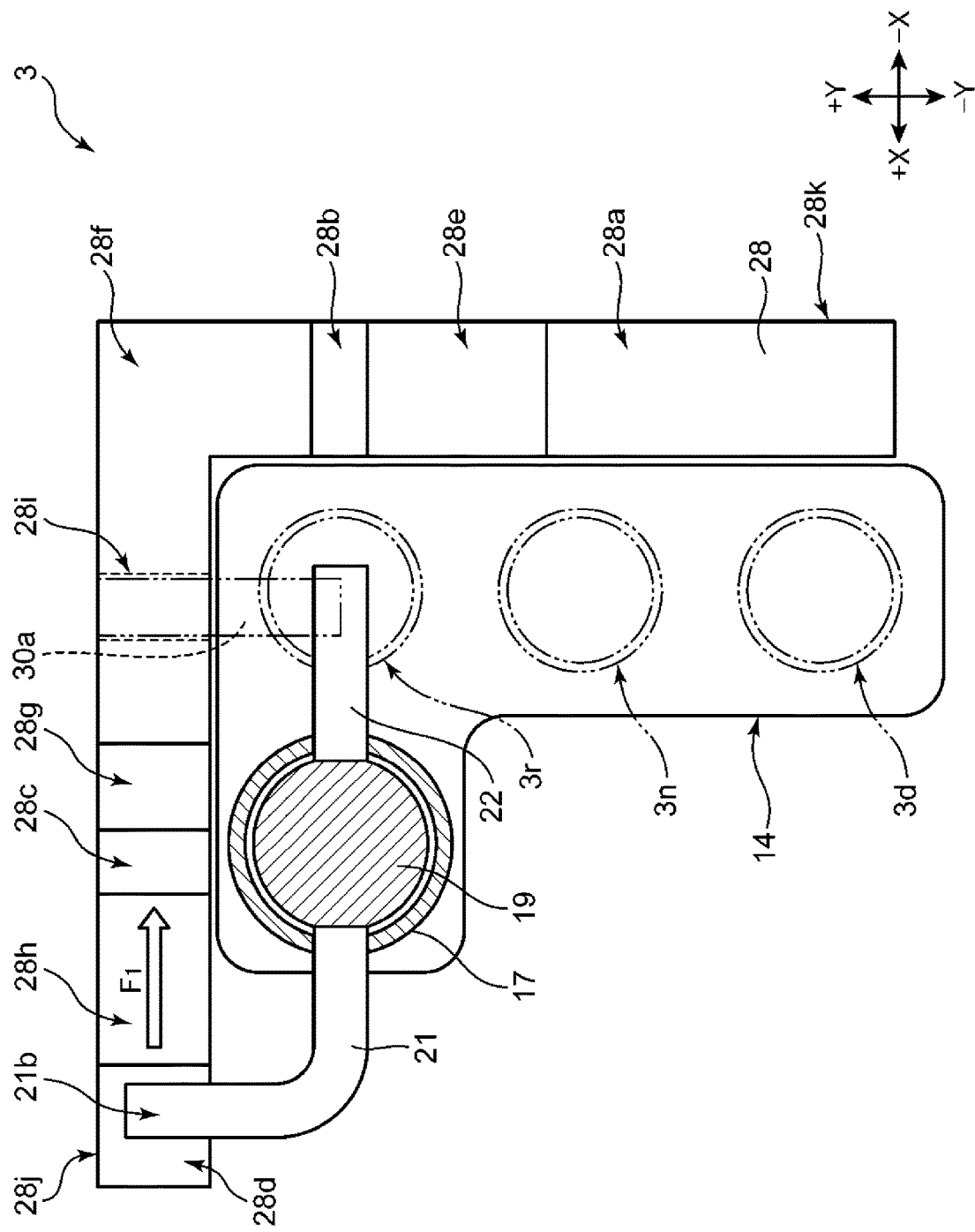
FIG. 11 is a schematic plan view illustrating the state of a plunger with respect to the shift lever when the shift position is the P-position.

The movement from the P-position 3p to the R-position 3r in the vehicle shifter device 3 will be additionally described with reference to FIG. 11. FIG. 11 is a schematic plan view illustrating the state of the plunger 30a with respect to the shift lever 11 when the shift position is the P-position.

As illustrated in FIG. 11, when the shift position is the P-position 3p, the plunger 30a of the solenoid 30 projects toward the −Y side of the first extension portion 28j of the lock plate 28. Accordingly, if the driver tries to move the shift lever 11 toward the −X side by depressing only the push button 13, the plunger 30a makes contact with the lever body 17 or the lever body 18 (the lever body 18 is not illustrated in FIG. 11) and prevents the shift lever 11 from moving to the −X side. When the shift lever 11 is moved from the P-position 3p to the R-position 3r, the driver needs to perform the operation described above while depressing the brake pedal 10.

[Modification]

Although the operation that depresses the push button 13 shallowly is adopted as an example of the first operation as illustrated in FIG. 4B and the operation that depresses the push button 13 deeply is adopted as an example of the second operation as illustrated in FIG. 4C in the above embodiment, the disclosure is not limited to this example. For example, it is possible to adopt the operation in which the driver depresses the shift knob 12 itself toward the −Z side as the second operation.

Although the first lock lever 21 is L-shaped in plan view in the above embodiment, the disclosure is not limited to this example. For example, the first lock lever may have a shape extending linearly like the second lock lever.

Although two lock levers (the first lock lever 21 and the second lock lever 22) are connected to the rod 19 in the above embodiment, the disclosure is not limited to this example. For example, only one lock lever may be connected to the rod 19.

Although the vehicle shifter device 3 has four positions (the D-position 3d, the N-position 3n, the R-position 3r, and the P-position 3p) in the above embodiment, the disclosure is not limited to this example. For example, the vehicle shifter device 3 may further have a position corresponding to the manual mode.

Although the above embodiment adopts a right-hand drive vehicle having a driver seat on the right side in a vehicle as an example, the disclosure is applicable to a left-hand drive vehicle.

What is claimed is:

1. A vehicle shifter device that performs a switchover among a plurality of speed ranges of a vehicle including a parking range, a reverse range, a neutral range, and a drive range based on an operation by a driver, the vehicle shifter device comprising:

a shift lever configured to receive an input by the driver and has a plurality of positions corresponding to the plurality of speed ranges; and a lever location holding part configured to hold the positions of the shift lever in locations selected by the driver, wherein a path of movement of an upper end part of the shift lever when the driver performs a switchover among the reverse range, the neutral range, and the drive range is different in direction from a path of movement of the upper end part when the driver performs a switchover between the parking range and the reverse range, the shift lever is configured to receive a first operation from the driver in addition to the movement of the upper end part when the driver performs a switchover between the reverse range and the neutral range, and the shift lever is configured to receive a second operation from the driver in addition to the movement of the upper end part when the driver performs a switchover between the parking range and the reverse range, the second operation having a different operational degree from the first operation or the second operation being a different operation from the first operation, the lever location holding part is a lock plate having a plurality of concave parts recessed upward so as to correspond to the plurality of positions of the shift lever, the lock plate includes a first extension portion along the path of the movement of the shift lever when the driver performs a switchover between the parking range and the reverse range and a second extension portion along the path of the movement of the shift lever when the driver performs a switchover among the reverse range, the neutral range, and the drive range, the first extension portion being formed integrally with the second extension portion, and has an L shape as a whole in plan view seen from above, the shift lever is provided with a push button in the upper end part thereof through which the operation by the driver is received, the first operation is to depress the push button to a predetermined depth by the driver, the second operation is to depress the push button to a depth larger than the predetermined depth by the driver, the shift lever further includes a lever body that is a cylindrical body, a shift knob that is attached to an upper end portion of the lever body, and at least one lock lever projecting radially outward from a part of the lever body, the part being disposed below the shift knob, the push button is provided in the upper end portion of the lever body, the lock lever moves up and down in a cylindrical axis direction of the lever body when the driver depresses the push button and the lock lever is locked to or released from the lever location holding part when the lock lever moves up and down, the at least one lock lever includes a first lock lever projecting in one direction of radial directions of the lever body and a second lock lever projecting in a direction opposite to the one direction of the radial directions of the lever body, the first lock lever includes a root portion extending linearly in the one direction from the lever body and an end portion bent in a direction orthogonal to the root portion from an end of the root portion, the root portion being formed integrally with the end portion, and the second lock lever extends linearly in the direction opposite to the one direction in plan view in which the shift lever is seen from the cylindrical axis direction of the lever body, the concave parts to which the first lock lever is locked when the parking range and the reverse range are selected are formed in the first extension portion, and the concave parts to which the second lock lever is locked when the reverse range, the neutral range, and the drive range are selected are formed in the second extension portion.

2. The vehicle shifter device according to claim 1, wherein since the lock levers are elastically biased upward in an axial direction of the lever body, the lock levers are located at upper ends of movable ranges of the lock levers when the driver does not depress the push button, and the lock plate locks at least one of the first lock lever and the second lock lever so as to correspond to the plurality of positions of the shift lever.

3. The vehicle shifter device according to claim 2, wherein the plurality of concave parts provided in the first extension portion of the lock plate include a first concave part that locks the first lock lever when the driver selects the parking range and a second concave part that locks the first lock lever when the driver selects the reverse range, the plurality of concave parts provided in the second extension portion of the lock plate include a third concave part that locks the second lock lever when the driver selects the reverse range and a fourth concave part that locks the second lock lever when the driver selects the neutral range, a first convex part projecting downward is provided between the first concave part and the second concave part in the first extension portion of the lock plate, a second convex part projecting downward is provided between the third concave part and the fourth concave part in the second extension portion of the lock plate, and a height of the first convex part relative to bottoms of the first concave part and the second concave part is larger than a height of the second convex part relative to bottoms of the third concave part and the fourth concave part.

4. The vehicle shifter device according to claim 3, wherein when the driver selects the reverse range, the first lock lever is locked to the second concave part and the second lock lever is locked to the third concave part.

5. A vehicle shifter device that performs a switchover among a plurality of speed ranges of a vehicle including a parking range, a reverse range, a neutral range, and a drive range based on an operation by a driver, the vehicle shifter device comprising:

a shift lever configured to receive an input by the driver and has a plurality of positions corresponding to the plurality of speed ranges; and a lever location holding part configured to hold the positions of the shift lever in locations selected by the driver, wherein a path of movement of an upper end part of the shift lever when the driver performs a switchover among the reverse range, the neutral range, and the drive range is different in direction from a path of movement of the upper end part when the driver performs a switchover between the parking range and the reverse range, the shift lever is configured to receive a first operation from the driver in addition to the movement of the upper end part when the driver performs a switchover between the reverse range and the neutral range, and the shift lever is configured to receive a second operation from the driver in addition to the movement of the upper end part when the driver performs a switchover between the parking range and the reverse range, the second operation having a different operational degree from the first operation or the second operation being a different operation from the first operation, the shift lever is provided with a push button in the upper end part thereof through which the operation by the driver is received, the first operation is to depress the push button to a predetermined depth by the driver, the second operation is to depress the push button to a depth larger than the predetermined depth by the driver, the shift lever further includes a lever body that is a cylindrical body, a shift knob that is attached to an upper end portion of the lever body, and at least one lock lever projecting radially outward from a part of the lever body, the part being disposed below the shift knob, the push button is provided in the upper end portion of the lever body, the lock lever moves up and down in a cylindrical axis direction of the lever body when the driver depresses the push button and the lock lever is locked to or released from the lever location holding part when the lock lever moves up and down, the at least one lock lever includes a first lock lever projecting in one direction of radial directions of the lever body and a second lock lever projecting in a direction opposite to the one direction of the radial directions of the lever body, the first lock lever includes a root portion extending linearly in the one direction from the lever body and an end portion bent in a direction orthogonal to the root portion from an end of the root portion, the root portion being formed integrally with the end portion, and the second lock lever extends linearly in the direction opposite to the one direction in plan view in which the shift lever is seen from the cylindrical axis direction of the lever body, the lever location holding part is a lock plate having a plurality of concave parts recessed upward so as to correspond to the plurality of positions of the shift lever, the lock plate includes a first extension portion along the path of the movement of the shift lever when the driver performs a switchover between the parking range and the reverse range and a second extension portion along the path of the movement of the shift lever when the driver performs a switchover among the reverse range, the neutral range, and the drive range, the first extension portion being formed integrally with the second extension portion, and has an L shape as a whole in plan view seen from above, the concave parts to which the first lock lever is locked when the parking range and the reverse range are selected are formed in the first extension portion, and the concave parts to which the second lock lever is locked when the reverse range, the neutral range, and the drive range are selected are formed in the second extension portion.

6. The vehicle shifter device according to claim 5, wherein since the lock levers are elastically biased upward in an axial direction of the lever body, the lock levers are located at upper ends of movable ranges of the lock levers when the driver does not depress the push button, and the lock plate locks at least one of the first lock lever and the second lock lever so as to correspond to the plurality of positions of the shift lever.

7. The vehicle shifter device according to claim 6, wherein the plurality of concave parts provided in the first extension portion of the lock plate include a first concave part that locks the first lock lever when the driver selects the parking range and a second concave part that locks the first lock lever when the driver selects the reverse range, the plurality of concave parts provided in the second extension portion of the lock plate include a third concave part that locks the second lock lever when the driver selects the reverse range and a fourth concave part that locks the second lock lever when the driver selects the neutral range, a first convex part projecting downward is provided between the first concave part and the second concave part in the first extension portion of the lock plate, a second convex part projecting downward is provided between the third concave part and the fourth concave part in the second extension portion of the lock plate, and a height of the first convex part relative to bottoms of the first concave part and the second concave part is larger than a height of the second convex part relative to bottoms of the third concave part and the fourth concave part.

8. The vehicle shifter device according to claim 7, wherein when the driver selects the reverse range, the first lock lever is locked to the second concave part and the second lock lever is locked to the third concave part.

* * * * *